Feb. 13, 1951 B. A. CARROLL 2,541,336
SECRETARY'S ANSWERING KEY CABINET
Filed Aug. 23, 1948
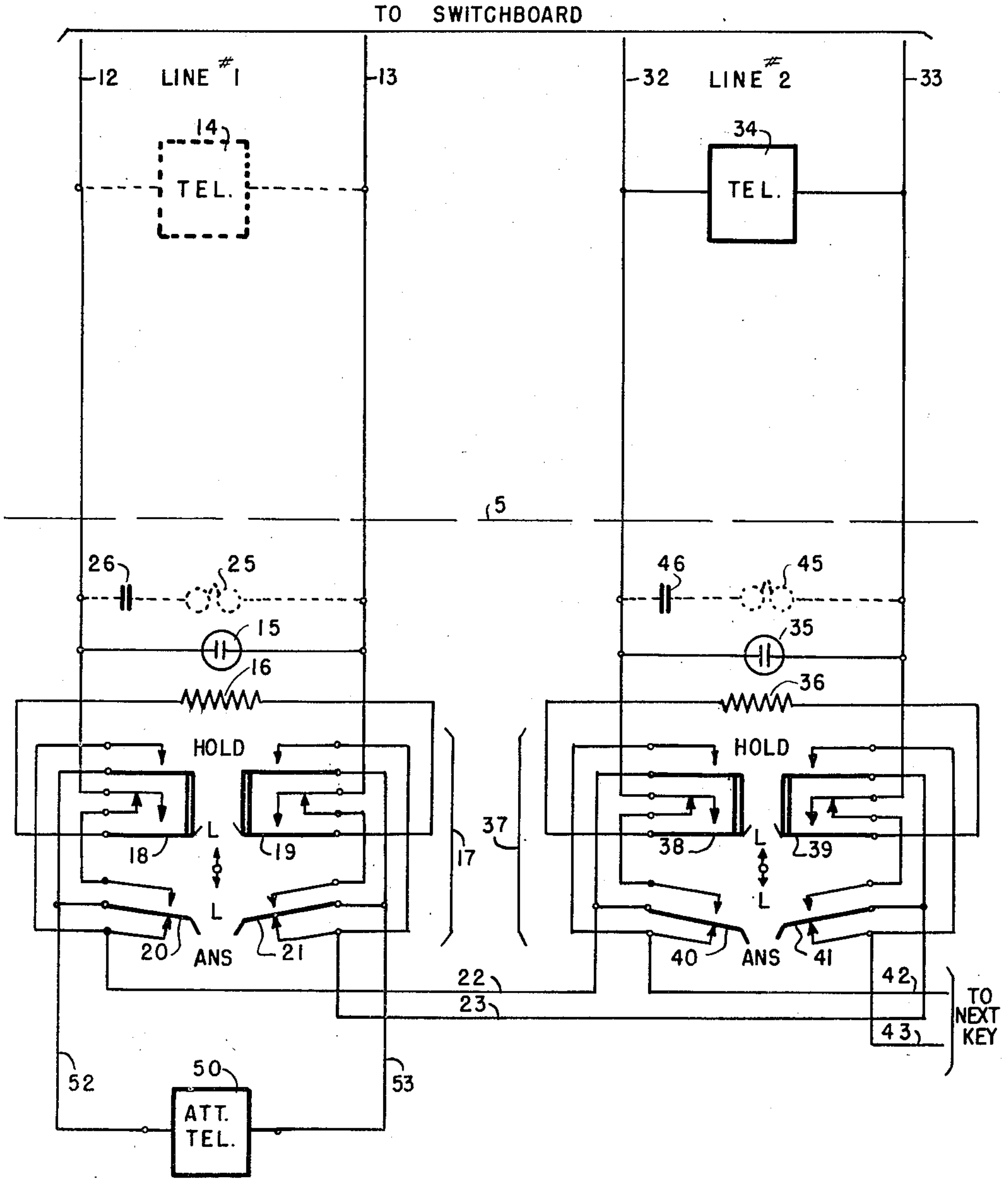
INVENTOR.
BERNARD A. CARROLL
BY Chas. W. Candy
ATTORNEY Patented Feb. 13, 1951

2,541,336

UNITED STATES PATENT OFFICE 2,541,336

SECRETARY'S ANSWERING KEY CABINET

Bernard A. Carroll, Lombard, Ill., assignor to Automatic Electric Laboratories, Inc., Chicago, Ill., a corporation of Delaware Application August 23, 1948, Serial No. 45,698

5 Claims. (Cl. 179—99)

This invention relates to telephone systems, but is more particularly concerned with auxiliary equipment by means of which calls to any one of a group of telephone lines may be supervised and answered from a common position, such as a secretary's or stenographer's desk. Thus, if the called party is not at his desk or is too busy to answer, the secretary or attendant will answer. Various schemes for giving this service are known in the art, but are either limited to a small number of lines, or require the use of one or more relays or a plurality of keys per line served, thus adding considerably to the cost.

The main object of the present invention is the provision of extremely simple and inexpensive means for giving service of this type to a considerable number of lines, without the use of relays. It is particularly adaptable to the supervision and answering of calls to a comparatively compact group of telephones, the bell signals of which are readily audible to the attendant.

The main feature of the invention is accordingly, the use of a simple key cabinet containing, basically, only a key, a glow discharge lamp, and a holding resistor for each line served.

Another feature is the use of simple three-position lever keys or the equivalent, with the circuits and connections so arranged that all operations are controlled by a simple movement of a key from one position to the next adjacent position.

Another feature is that calls may be held on any number of the lines involved, while a call is being answered on any remaining line.

In the drawing, two lines are shown, comprising conductors 12 and 13, and conductors 32 and 33, leading from a switchboard, not shown, which may be either automatic or manual but is here assumed to be automatic, to the telephones 14 and 34 respectively. The telephones 14 and 34, the details of which have been omitted from the drawing, may be any standard type of common battery instrument, with the usual bell signal normally connected across the line through the hookswitch, in series with a condenser. In case other telephones than those supervised are also within hearing of the attendant, bells having a distinctive tone may be used in one or the other group of telephones. If the number of such nearby unsupervised telephones is small however, this would not be necessary, as a glance at the signal lamps will tell the attendant whether a call is for a supervised station or not.

The attendant's key cabinet, shown below the dash line 5, consists basically of a glow discharge signal lamp such as 15 or 35, a holding resistor such as 16 or 36, and a three-position key such as 17 or 37, for each line to be supervised, together with an attendant's telephone 50. Each line is brought in to one side of the corresponding key, with the signal lamps connected directly across the line conductors as shown. The attendant's telephone is connected directly to the first key, and to the succeeding keys through a chain circuit comprising conductors such as 22 and 23, and 42 and 43. With all of the keys operated to the first or normal position as in the drawing, the attendant's telephone 50 is seen to be connected to all of the keys in the cabinet, and only to the keys.

In the basic arrangement, only lamp signals are provided in the attendant's cabinet, and the attendant's telephone 50 is used only for answering calls to other individuals. The attendant is then provided with a separate instrument for making and receiving personal calls. The dotted lines in the drawing represent alternative arrangements, or possible modifications in the basic arrangement. One such alternative arrangement would be to assign one of the lines coming into the cabinet, such as line #1, to the exclusive use of the attendant for personal calls. In this case, the telephone 14 would be omitted, and a ringer signal such as 25 would be connected across this line at the attendant's desk, in series with a condenser, such as 26. Also, if some of the telephones being supervised are too far away for the bell signals thereof to be easily heard, an extra ringer such as 45 could also be connected across the terminals of such lines at the attendant's desk, and mounted under the desk or wherever convenient. The impedance of these ringers would need to be such as not to interfere with conversation or dialling on these lines. Any line may be assigned to the attendant, but the attendant's telephone must be connected to the first key, as the chain circuit will not work in the reverse direction.

For the purpose of describing the operation of the equipment in detail, the basic arrangement, where the telephone 50 is used only for answering with the telephone 14 connected as shown, and the extra ringers such as 25 and 45 omitted, will be considered first. It will also be assumed that a call is first extended to line #1 and the telephone station 14, over the line conductors 12 and 13. When ringing current is applied, at the switchboard, to the line conductors 12 and 13 in known manner, the ringer, not shown, in the called telephone 14 responds, and is heard by the attendant. At the same time, the ringing voltage on the line breaks down the gap in the glow discharge signal lamp 15, and the latter lights intermittently, in unison with the ringer, to indicate the line being called. When the called station answers, the removal of the receiver or handset, not shown, from the telehone 14, will disconnect the ringer of this instrument from the line in known manner, and will cause the switchboard to remove ringing current from the line. The glow lamp 15 will accordingly stop flashing, and the attendant will pay no further attention to the call.

If the called party is away from his desk however, or does not answer the call for any reason, the attendant will answer by picking up her handset, and operating the key 17 to its second or middle position. The lower springs of the contact sets 20 and 21 thereupon open to disconnect the attendant's telephone from the chain conductors 22 and 23 leading to the other keys, while the upper springs of these contact sets close to connect the attendant's telephone to the called line conductors 12 and 13 in obvious manner. This will complete the called line loop, and the switchboard will remove ringing current from the line as before, and complete the talking circuit. The attendant will then converse with the calling party, and inform him of the absence of the called party, or give him such other information as the circumstances require. If she cannot furnish the information desired, she may take a message, or fill out a call memorandum, or if necessary she may have the called party paged, or call to him if he is within hearing.

If, while the attendant is conversing over line #1 in this manner, a call comes in for line #2, ringing current impressed on the line conductors 32 and 33 at the switchboard will ring the bell in the substation telephone 34 intermittently in the usual way, and will cause the glow lamp 35 to flash in unison. To answer this call, should the party 34 be also absent, or fail to answer, the attendant will ask the first calling party to hold the line a moment, and then operate the key 17 to its third or upper position. This operates the upper contact sets 18 and 19, but does not disturb the lower contact sets 20 and 21, which remain in their last operated position.

Upon the operation of the contact sets 18 and 19, as stated, the make-before-break springs thereof connect resistor 16 across the conductors 12 and 13 in obvious manner, to hold the call, and at the same time disconnect the attendant's telephone from this line. The upper make springs of the contact sets 18 and 19, on the other hand, re-connect the attendant's telephone to the chain conductors 22 and 23, and so to the other keys.

The attendant then operates the key 37 to its second or middle position, thereby connecting her telephone to line #2. This connection extends over the attendant's line conductors 52 and 53, through the upper make springs of the contact sets 18 and 19, chain conductors 22 and 23, upper springs of the contact sets 40 and 41, and break contacts of the make-before break springs in the contact sets 38 and 39, to the line conductors 32 and 33. The telephone 50 is thus connected across the line #2, and causes the removal of ringing current from this line. The lower springs of the contact sets 40 and 41 at the same time disconnect the attendant's telephone from the chain conductors 42 and 43, and so from the succeeding keys, not shown.

The attendant may then converse with the second calling party, and may dispose of this call before returning to the first call, or she may ask the second party to hold the line a moment, and return immediately to the first call. In the latter case, the key 37 is operated to its third or upper position. In this position, the make-before-break springs of the contact sets 38 and 39 connect the resistor 36 across the line conductors 32 and 33, and disconnect the attendant's telephone therefrom. At the same time the upper make springs of the contact sets 38 and 39 reconnect the operator's telephone to the chain conductors 42 and 43 and so to the succeeding keys. This connection is through the upper make springs of the contact sets 18 and 19, in series with the upper make springs of the contact sets 38 and 39.

The attendant now returns to the call on line #1 by restoring the key 17 to its second or middle position thereby restoring the contact sets 18 and 19 to their normal position. This disconnects the resistor 16, re-connects the attendant to the line conductors 12 and 13 by way of the upper spring of the contact sets 20 and 21 in series with the break springs of the contact sets 18 and 19 as before, and again disconnects the attendant from the chain conductors 22 and 23. As soon as this call is disposed of, in one way or another, the attendant restores the key 17 to its first or orginal position. This moves the contact sets 20 and 21 to the position shown in the drawing thereby disconnecting the attendant from line #1 and re-connecting her to the chain conductors 22 and 23 and thus to the remaining keys. The attendant may then return to the held call on line #2 by restoring the key 37 to its middle position, or may answer a call on any other of the supervised lines, before returning to this call.

The extra ringers, when used in association with any of the supervised lines, have no effect on the operation as outlined in the preceding paragraphs, but merely serve to provide an audible signal for these lines which is within hearing range of the attendant.

In cases where the first line is assigned to the attendant, the telephone 14 would be omitted as previously stated, and replaced by a bell signal 25 at the attendant's desk, connected as shown. An incoming call for the attendant would then operate the bell 25 and the lamp signal 15, and the attendant would answer as for any other call, by operating the associated key to its second or middle position. To make an outgoing call, the attendant would likewise first operate the key 17 to its middle position, and would then dial up the call in the usual manner.

It is possible to dispense with the extra ringer for the attendant, if desired, by assigning the last line to her use, and having her leave the last key always in the second or middle position. The attendant's telephone would then always be connected to this line except when another key was in the second or answer position. An incoming call to the attendant, with all other keys in their first position, and the attendant's handset in place, would ring the bell in the telephone 50, and the attendant would answer merely by removing her handset. If the attendant's handset was already off, to answer another call, her line would of course be made busy to incoming calls during such time that she might be connected thereto during the manipulation of the keys.

The description of the invention having been completed, what is considered new and is desired to have secured by Letters Patent is set forth in the appended claims.

What is claimed is:

1. In a telephone system, two substation lines, a three-position key for each of said lines each said key identical with the other, each completely independent of the other mechanically, and each normally operated to a given first one of its positions, first and second sets of contacts controlled by each of said keys, an attendant's telephone, a circuit completed by one of said first sets of contacts in response only to said attendant moving one of said keys from its first position to its second position for connecting said telephone to the line associated with such key to answer a call to such line, a second circuit completed by the corresponding second set of said contacts in response only to said attendant moving the same key from its second position to its third position for connecting a holding bridge to said line and freeing said telephone for similarly answering and holding a call to said other substation line by a similar operation of said other key, other identical keys and lines, and circuit means responsive to said first named keys being in either of said first and third positions for preparing said other keys for similarly answering and holding calls on said other lines.

2. In a telephone system, a plurality of substation lines, a three-position key connected to each of said lines, each key mechanically independent of any other key and normally operated to a first one of its three positions, contacts on said keys, a chain circuit, an attendant's telephone connected directly to one of said keys and to the other keys only through said chain circuit, means comprising said contacts and said chain circuit for connecting said attendant's telephone to any one of said lines in response only to the operation of the key connected to said one line from its first position to its second position to answer a call to such line, and for disconnecting said telephone from the keys following such operated key in the chain, a holding resistor for each said key, and said means responsive to the movement of said operated key from its second position to its third position for connecting the associated resistor to such line to hold the call thereon, for disconnecting said attendant's telephone from such line and for re-connecting it to the previously disconnected keys for similarly answering and holding a call to any other of said lines by similar movements of the key connected to such other line.

3. In a telephone system, first and second substation lines, first and second three-position lever keys completely independent of each other mechanically, said keys having first and third extreme positions and a middle position and normally operated to said first position, first and second contact sets on said keys, an attendant's telephone, a circuit completed by the first set of contacts on said first key responsive to the movement of said key from said first position to said middle position for connecting said attendant's telephone through said key's first and second sets of contacts to the line associated with such key to answer a call to such line, circuit means including the second set of said contacts on said first key responsive to the movement of said key from said middle position to said third position for holding such call and freeing said telephone therefrom, another circuit completed by the first set of contacts on said second key responsive to the movement of said second key from its first position to its middle position for connecting said telephone through said second contact set of said first key and both contact sets of said second key to said second line to answer a call to such line, other similar lines and keys likewise independent mechanically, a two-conductor chain circuit only interconnecting said keys, and means including said chain circuit and the contacts of said keys for similarly holding calls on any number of said lines through the respective keys associated therewith while a call is being answered to any other of said lines.

4. In a telephone system as in claim 3, means including said chain circuit for re-connecting said attendant's telephone to any one of said held lines in response only to restoration of the associated key from its third position to its middle position.

5. In a telephone system, an attendant's answering device for supervising and answering calls to any number of substation lines, while holding calls on any one or all of the other lines involved, said device comprising only a lever key, a resistor and an incoming call lamp signal for each line supervised, a chain circuit interconnecting said keys, and an attendant's telephone common to said keys, each said key mechanically independent of any other key, said calls being signalled by the corresponding lamp, said calls being answered responsive to a first movement of the corresponding key from a normal first position to an intermediate second position for connecting said telephone to the corresponding calling line over said chain circuit, said calls being held over the corresponding resistor responsive only to a second movement of such corresponding key from said second position to a third position, and said telephone being reconnected to any one of said held lines over said chain circuit responsive only to a movement of the corresponding key from its said third position to said second position.

B. A. CARROLL.

REFERENCES CITED

The following references are of record in the file of this patent:

UNITED STATES PATENTS

| Number | Name | Date |
|---|---|---|
| 1,097,760 | Koltonski | May 26, 1914 |
| 1,222,879 | Lundell | Apr. 17, 1917 |
| 1,783,310 | Saunders | Dec. 2, 1930 |
| 1,932,647 | Stehlik | Oct. 31, 1933 |
| 2,410,062 | Haigh | Oct. 29, 1946 |

FOREIGN PATENTS

| Number | Country | Date |
|---|---|---|
| 342,726 | Great Britain | Feb. 5, 1931 |
| 434,134 | Great Britain | Aug. 27, 1935 |